United States Patent
Mutnuru

(10) Patent No.: US 11,438,166 B2
(45) Date of Patent: Sep. 6, 2022

(54) SYSTEM AND METHOD FOR USE OF A SUFFIX TREE TO CONTROL BLOCKING OF BLACKLISTED ENCRYPTED DOMAINS

(71) Applicant: ORACLE INTERNATIONAL CORPORATION, Redwood Shores, CA (US)

(72) Inventor: Rishi Mutnuru, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 62 days.

(21) Appl. No.: 16/824,260

(22) Filed: Mar. 19, 2020

(65) Prior Publication Data

US 2021/0297263 A1    Sep. 23, 2021

(51) Int. Cl.
| | | |
|---|---|---|
| *H04L 9/32* | (2006.01) | |
| *H04L 61/256* | (2022.01) | |
| *H04L 61/4511* | (2022.01) | |
| *H04L 9/40* | (2022.01) | |

(52) U.S. Cl.
CPC ........ *H04L 9/3242* (2013.01); *H04L 61/1511* (2013.01); *H04L 61/2571* (2013.01); *H04L 63/0236* (2013.01)

(58) Field of Classification Search
None
See application file for complete search history.

(56) References Cited

U.S. PATENT DOCUMENTS

| | | | |
|---|---|---|---|
| 2010/0235915 A1* | 9/2010 | Memon | H04L 63/145 726/23 |
| 2014/0149105 A1* | 5/2014 | Lamba | G06F 40/279 704/9 |
| 2017/0272454 A1* | 9/2017 | Seo | H04L 1/203 |
| 2018/0063084 A1* | 3/2018 | Wakumoto | H04L 45/64 |
| 2020/0007548 A1* | 1/2020 | Sanghavi | H04L 63/0209 |

OTHER PUBLICATIONS

FedRAMP, "How to Become FedRAMP Authorized | FedRAMP. gov", retrieved from: <https://www.fedramp.gov/> on Apr. 14, 2022, 11 pages.
FedRAMP, "Documents | FedRAMP.gov", retrieved from: <https://www.fedramp.gov/documents/> on Dec. 13, 2019, 15 pages.
(Continued)

*Primary Examiner* — Mohamed Ibrahim
(74) *Attorney, Agent, or Firm* — Tucker Ellis LLP

(57) ABSTRACT

In accordance with an embodiment, described herein are systems and methods for use of a suffix tree to control blocking of blacklisted encrypted domains. A suffix tree includes encrypted hash keys corresponding to a plurality of domain nodes. A domain-related request packet is received, and a target domain name extracted from the packet. A pair of hash keys are generated for the request packet and target domain; and a hash table is searched with the generated hash key pair. If a corresponding entry is found in the hash table, then a corresponding hash suffix pointer is determined for the packet, and the suffix tree examined to determine whether the node identified by the query is part of a blacklisted node. If the suffix tree indicates the node to be part of a blacklisted node, then the system can perform a specified action associated with that node.

15 Claims, 14 Drawing Sheets

(56) References Cited

OTHER PUBLICATIONS

Infosec, "Understanding DNS Sinkholes—A weapon against malware", retrieved from: <https://resources.infosecinstitute.com/dns-sinkhole/> on Dec. 13, 2019, 12 pages.

Enisa, "DNA Sinkhole", Published under Glossary (https://www.enisa.europa.eu/topics/csirts-in-europe/glossary), retrieved from: <https://www.enisa.europa.eu/topics/csirts-in-europe/glossary/dns-sinkhole> on Dec. 13, 2019, 3 pages.

Wikipedia, "Suffix tree—Wikipedia", retrieved from: <https://en.wikipedia.org/wiki/Suffix_tree> on Dec. 13, 2019, 9 pages.

Palo Alto Networks, "DNS Sinkholing", on Dec. 13, 2019, 5 pages, retrieved from: <https://docs.paloaltonetworks.com/pan-os/7-1/pan-os-admin/threat-prevention/use-dns-queries-to-identify-infected-hosts-on-the-network/dns-sinkholing>.

* cited by examiner

File Database 102 (Example)

```
Asymmetric HASHMETHOD: HMAC SHA256; HASH KEY: abcd; Labels:

Blacklisted Domain Name File Specified

6c9f6a512f6ab5e6d971e4f66c0f89f7a91aac05e6865672eb47c8881130a90, Drop,     IP=NA
3866d034a1feaafcba77ab39affb8d1b6d6617f82fd34f9727fddd145985c7e9, Sinkhole, IP=1.1.1.1
7ec9054c36d02cd3122ba3143a8f32f50945eea67e1f27e1f0d76d3c8e3e3fb4, Sinkhole, IP=1.1.1.1
```

Corresponding Plain Text 104 (Example)

```
badsite.com , 2.badsite.com , 4.3.2.1.badsite.com , x.badsite.com
```

*FIGURE 1*

SYSTEM AND METHOD FOR USE OF A SUFFIX TREE TO CONTROL BLOCKING OF BLACKLISTED ENCRYPTED DOMAINS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer networks, network security devices, and cloud computing environments, and are particularly related to systems and methods for use of a suffix tree to control blocking of blacklisted encrypted domains, and filtering of Domain Name Service requests.

BACKGROUND

Many enterprises having sophisticated computing environments, which include access to online sites and services, adopt threat detection techniques, including identifying lists of blacklisted domain names which can pose serious security threats, malware, or phishing attacks.

These lists are typically provided to the enterprise's network security devices, for example network firewalls, which then operate to intercept network traffic in accordance with the lists, for example as received from user devices acting as Domain Name Service requests (DNS) clients making DNS requests.

Operational requirements such as compliancy with the United States of America's government Federal Risk and Authorization Management Program (FedRAMP) generally forbid network security devices used in enterprise software environments from maintaining a plain-text domain-name to encrypted-crypto hash mapping stored directly in the enterprise software. Administrator or users who have access to the network security device must not know which domains are blacklisted. Instead, the names of blacklisted domains must be encrypted using asymmetric crypto hash methods. The network security devices must then compare received domain-name requests against the encrypted list provided by FedRAMP or local regulatory authorities, and perform an appropriate action dictated by DNS sinkhole policies (for example, to drop or respond to the request with a DNS sinkhole IP).

However, this process is a costly operation in terms of performance, since both the domain-name, and all of the labels, must be converted to encrypted hash; and then lookups have to be made from the provided sinkhole database.

SUMMARY

In accordance with an embodiment, described herein are systems and methods for use of a suffix tree to control blocking of blacklisted encrypted domains. A suffix tree includes encrypted hash keys corresponding to a plurality of domain nodes. A domain-related request packet is received, and a target domain name extracted from the packet. A pair of hash keys are generated for the request packet and target domain; and a hash table is searched with the generated hash key pair. If a corresponding entry is found in the hash table, then a corresponding hash suffix pointer is determined for the packet, and the suffix tree examined to determine whether the node identified by the query is part of a blacklisted node. If the suffix tree indicates the node to be part of a blacklisted node, then the system can perform a specified action associated with that node.

BRIEF DESCRIPTION OF THE DRAWINGS

FIG. 1 illustrates an example file database for use in filtering domain-related requests, in accordance with an embodiment.

DETAILED DESCRIPTION

As described above, operational requirements such as FedRAMP compliancy generally forbid network security devices used in enterprise software environments from maintaining a plain-text domain-name to encrypted-crypto hash mapping stored directly in the enterprise software. Instead, the names of blacklisted domains must be encrypted using asymmetric crypto hash methods; and the network security devices must then compare received domain-name requests against the encrypted list.

FIG. 1 illustrates an example file database for use in filtering domain-related requests, in accordance with an embodiment.

As illustrated in FIG. 1, in accordance with an embodiment, a file database 102 can comprise, for example, an encrypted-crypto hash mapping of various blacklisted domain names. In the example illustrated, the file database can correspond to entries with a corresponding plain text 104 of, for example, "badsite.com", "2.badsite.com", "4.3.2.1.badsite.com" and "x.badsite.com".

Figure 2:
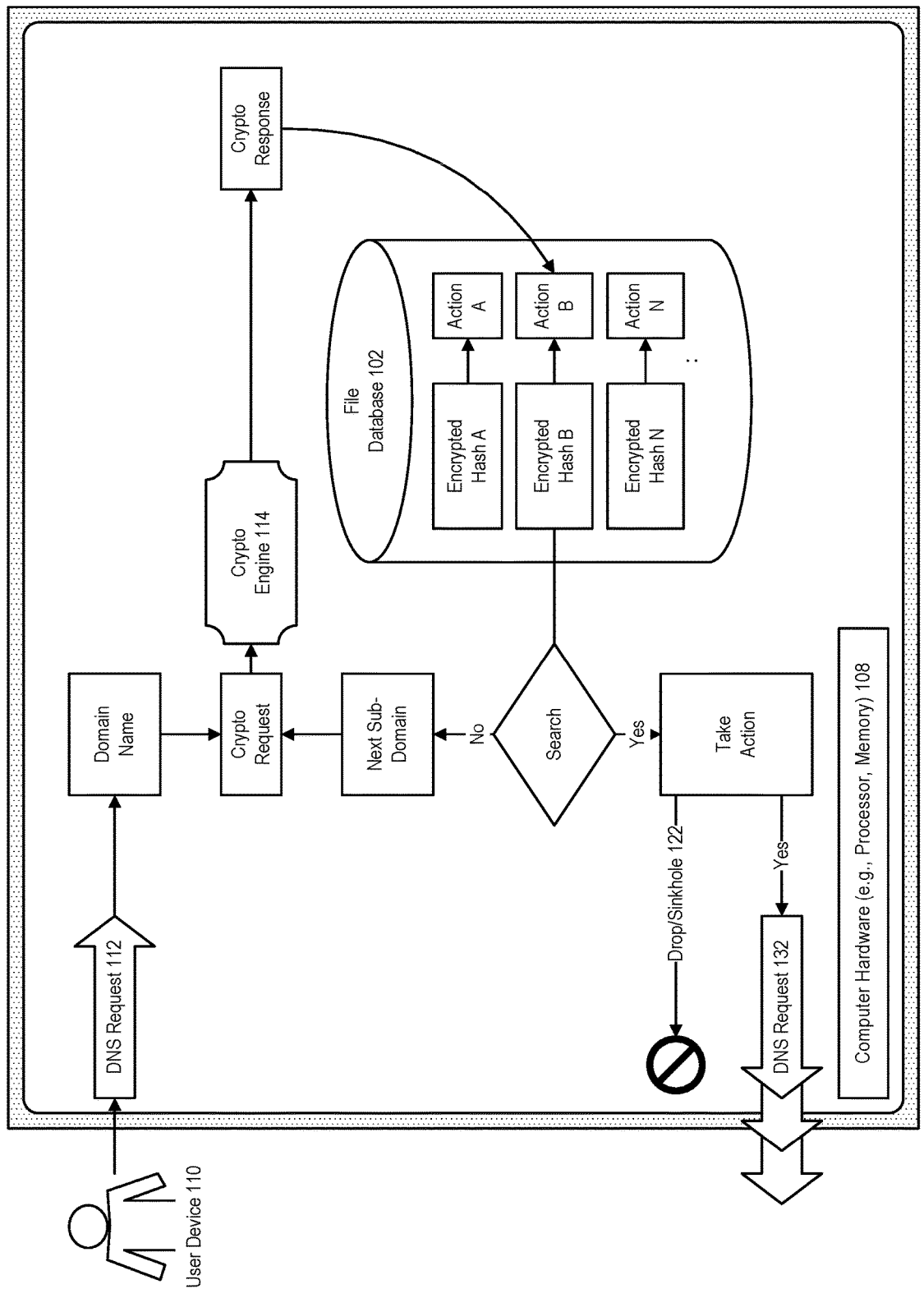
FIG. 2 illustrates an approach to filtering of domain-related requests using a crypto engine, in accordance with an embodiment.

FIG. 2 illustrates an approach to filtering of domain-related requests using a crypto engine, in accordance with an embodiment.

As illustrated in FIG. 2, in accordance with an embodiment, a system for DNS filtering, for example a network security device, or cloud computing, or other computing environment, can include a computer hardware (e.g., processor, memory) 108, and be adapted to handle DNS or other domain-related requests from a user device 110.

In accordance with a conventional approach, when a DNS or other domain-related request packet 112 is received, the domain-name is extracted and converted to encrypted crypto hash by posting crypto requests to a hardware or software crypto engine 114.

Upon receiving a response, the blacklist file database will be looked up. If the lookup is successful, then an appropriate action specified for this domain-name will be performed. Otherwise, a crypto hash will have to be calculated for the domain-name starting from the next label ("." prefix), and again the blacklist file database has to be looked up for a matching hashed value. This process will continue until the last label. The same procedure is repeated for every DNS or other domain-related request packet. The request packet can then either be dropped or directed to a sinkhole 122; forwarded 132; or otherwise processed as appropriate.

However, as described above, this process is a costly operation in terms of performance, since both the domain-name, and all of the labels, must be converted to encrypted hash; and then lookups have to be made from the provided sinkhole database.

Use of Suffix Trees to Control Blocking of Blacklisted Encrypted Domains

In accordance with an embodiment, described herein are systems and methods for use of a suffix tree to control blocking of blacklisted encrypted domains. A suffix tree includes encrypted hash keys corresponding to a plurality of domain nodes. A domain-related request packet is received, and a target domain name extracted from the packet. A pair of hash keys are generated for the request packet and target domain; and a hash table is searched with the generated hash key pair. If a corresponding entry is found in the hash table, then a corresponding hash suffix pointer is determined for the packet, and the suffix tree examined to determine whether the node identified by the query is part of a blacklisted node. If the suffix tree indicates the node to be part of a blacklisted node, then the system can perform a specified action associated with that node.

In accordance with an embodiment, the described approach provides a method by repeated hardware or software crypto requests can be avoided, and instead the system can re-use historically processed domain-names and thereby reduce the processing time on sub-labels. The described approach makes use of the most recently and commonly processed information to be reused for performance reasons.

Generally described, in accordance with an embodiment, the described approach derives a hash key pair from an extracted domain-name (for example as illustrated in Table 1). For the first time, it performs the crypto operation on a domain-name up to n labels, and receives encrypted crypto hash values for each of the sub-label. It then maintains an indirect mapping between this hash key pair and the generated encrypted asymmetric hash; and also maintains a suffix tree of encrypted hash keys to avoid multiple crypto operations on multiple levels. The next time when the same DNS or other domain-related request packet is received, the crypto hash generation for multiple sub-levels can be avoided; and lookup for a sub-level domain in the filed database can be optimized.

TABLE 1

| Domain | Label (5 label case) | Comment |
| --- | --- | --- |
| x.y.z.w.com | x.y.z.w.com<br>y.z.w.com<br>z.w.com<br>w.com<br>com | Blocking the parent domain must block all the child domains (label). For example, blocking "z.w.com" must also block the domains "y.z.w.com" and "Z.y.z.w.com". |

In accordance with an embodiment, the use of a hash key pair is advantageous over the use of a single hash key in avoiding collisions in the hash table. Additionally, the plain-text representing a hash key pair can never be decoded from access to a core-dump.

In accordance with an embodiment, the use of a suffix tree—an ordered tree data structure containing all of the suffixes of a given text as its keys, and positions in the text as their values—is advantageous in that it incurs less complexity to traverse sub-labels. Nodes can be inserted such that a parent node is the sub-label for a given domain name. For repeated queries, lookups for sub-labels can be made without converting each of the plain-text sub-label into an encrypted crypto hash.

In accordance with various embodiments, technical advantages of the described approach include that it can leverage much of the encrypted crypto hash conversions; provides a method through which network security devices can optimize multiple lookups on the domain-names up to n labels (each label is sub domain); and enables a cloud provider or security software vendor to block blacklisted domain DNS queries or direct them to a sinkhole in a cloud environment with high performance and scale.

Figure 3:
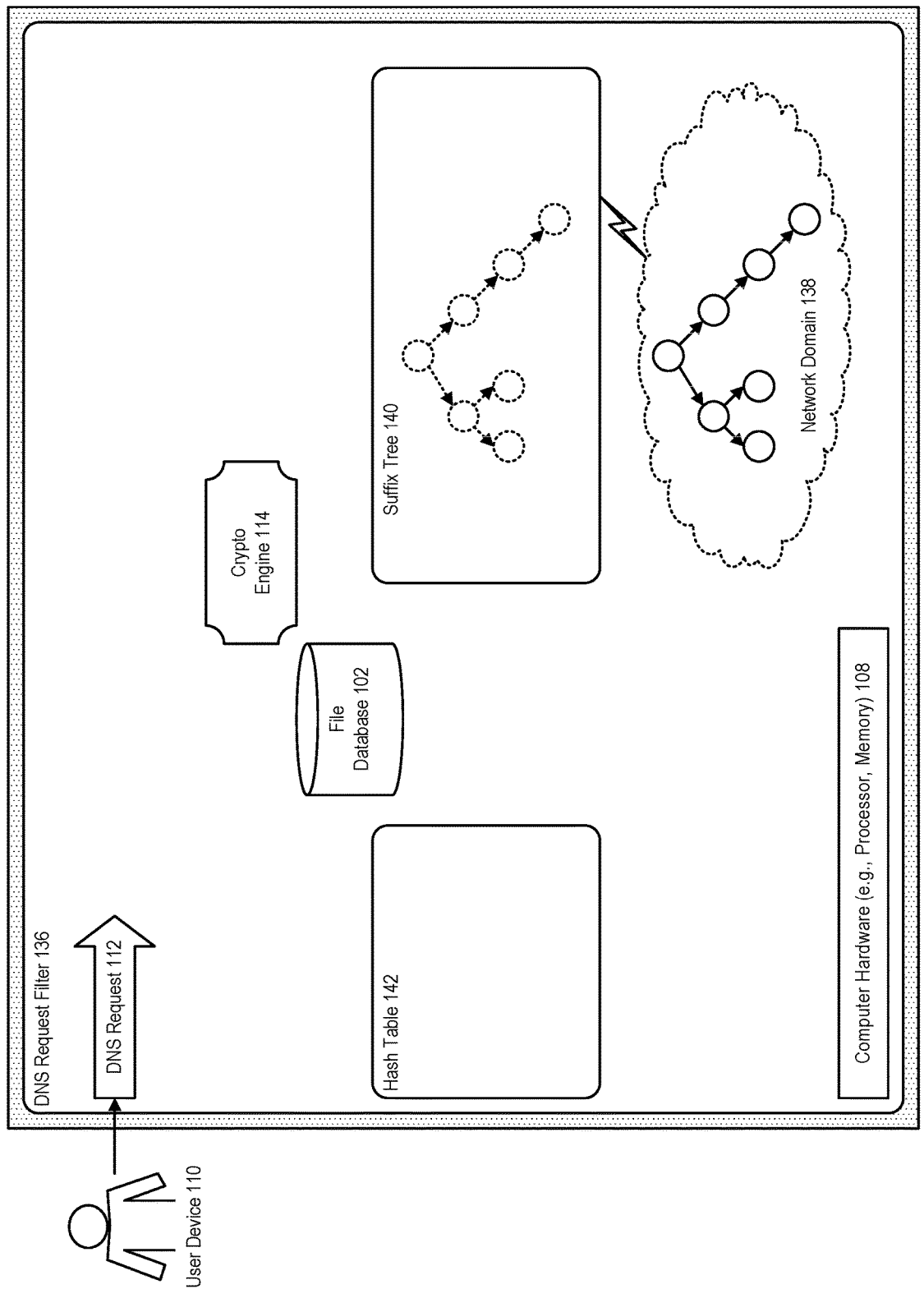
FIG. 3 illustrates a system and method for use of a suffix tree to control blocking of blacklisted encrypted domains, in accordance with an embodiment.

FIG. 3 illustrates a system and method for use of a suffix tree to control blocking of blacklisted encrypted domains, in accordance with an embodiment.

As illustrated in FIG. 3, in accordance with an embodiment, a DNS request filter 136, that operates in accordance with the teachings herein, can be provided by, for example, a network security device, cloud computing, or other computing environment that includes a computer hardware (e.g., processor, memory) and is adapted to handle DNS or other domain-related requests from a user device directed to one or more network domain(s) 138.

In accordance with an embodiment, as further described below, the DNS request filter operates with a suffix tree 140 of encrypted hash keys corresponding to the domain nodes, and a hash table 142 that maintains a plurality of hash key pairs, each of which can be stored in memory and which the DNS request filter uses to control blocking of blacklisted encrypted domains.

Figure 4:
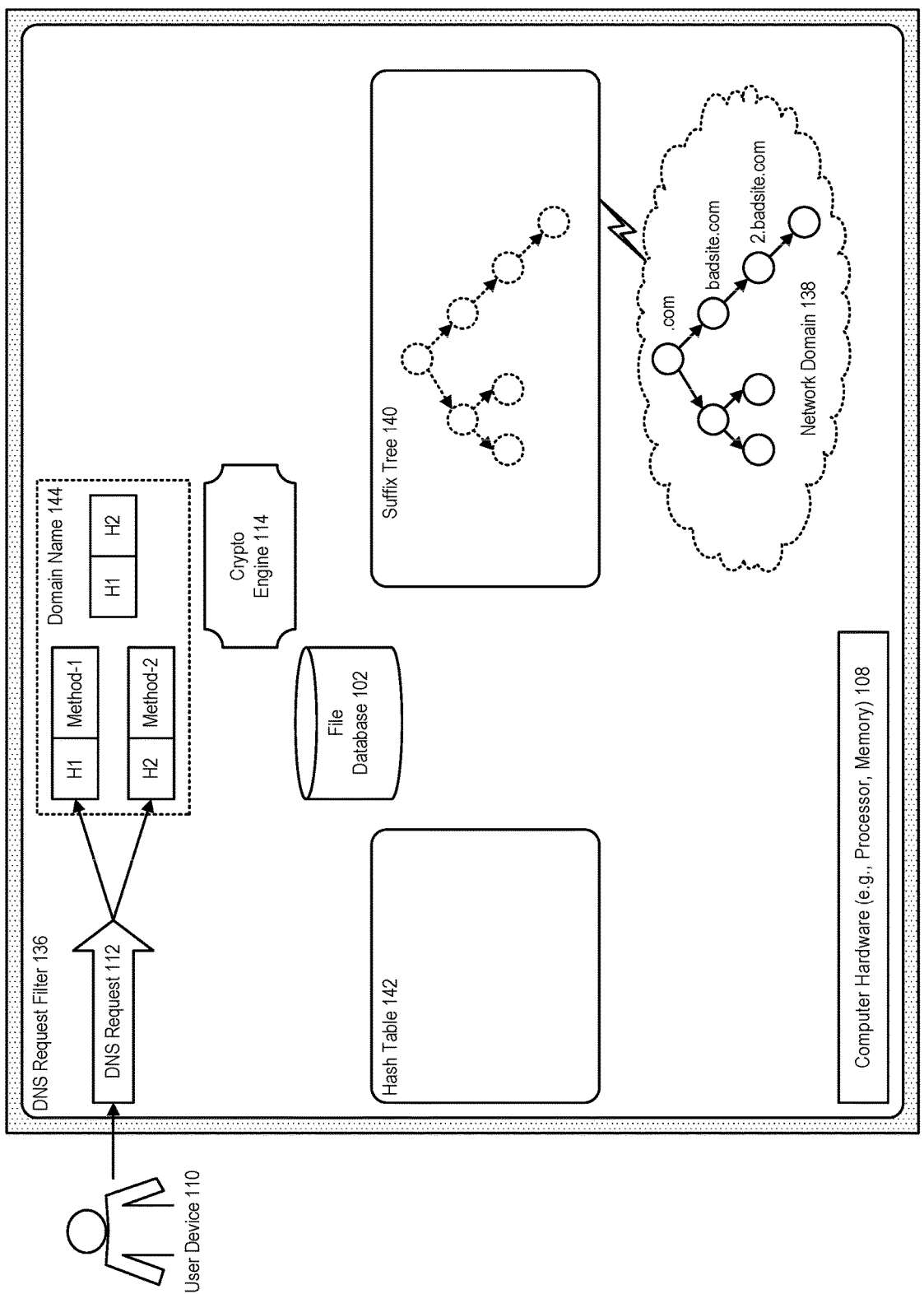
FIG. 4 further illustrates a system and method for use of a suffix tree to control blocking of blacklisted encrypted domains, in accordance with an embodiment.

FIG. 4 further illustrates a system and method for use of a suffix tree to control blocking of blacklisted encrypted domains, in accordance with an embodiment.

As illustrated in FIG. 4, in accordance with an embodiment, a DNS or other domain-related request packet (112) is received, and a target domain name 144 is extracted from the packet. A pair of hash keys (H1, H2) are generated for the request packet and target domain, using a hash key generation method.

Figure 5:
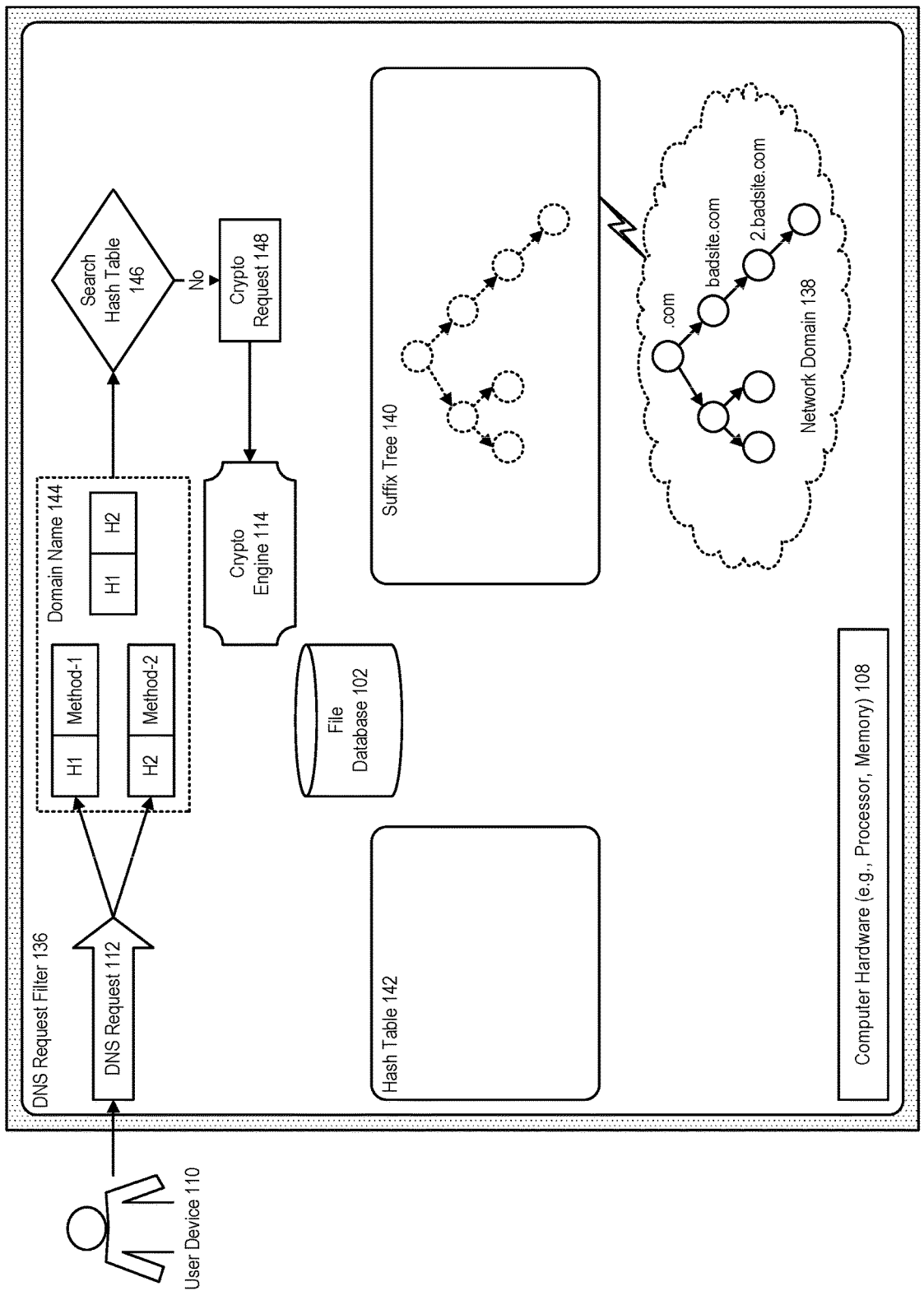
FIG. 5 further illustrates a system and method for use of a suffix tree to control blocking of blacklisted encrypted domains, in accordance with an embodiment.

FIG. 5 further illustrates a system and method for use of a suffix tree to control blocking of blacklisted encrypted domains, in accordance with an embodiment.

As illustrated in FIG. 5, in accordance with an embodiment, the hash table is searched 146 with the generated hash key pair. If an entry corresponding to the generated hash key pair is not found in the hash table, then the system bulk posts or otherwise communicates crypto requests 148, for each of the domain name sub-labels associated with the domain name (as identified by the DNS or other domain-related request), to at least one of a hardware or software crypto engine.

For example, if the DNS or other domain-related request packet is directed to resolving the domain name "4.3.2.1.badsite.com", then crypto requests can be posted or otherwise communicated to the crypto engine for each of the "4.3.2.1.badsite.com", "3.2.1.badsite.com", "2.1.badsite.com", "1.badsite.com", and "badsite.com" domain name sub-labels.

Figure 6:
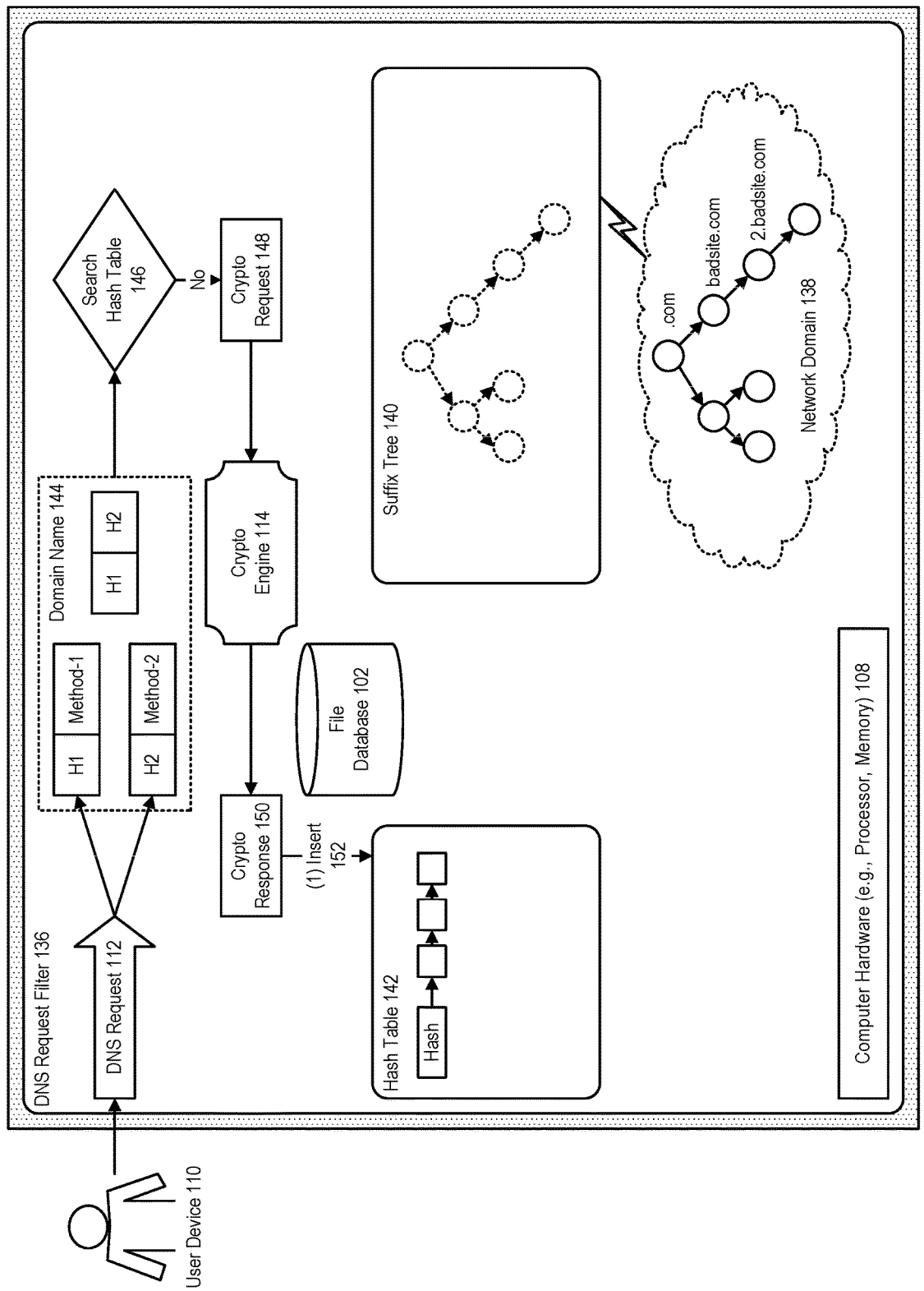
FIG. 6 further illustrates a system and method for use of a suffix tree to control blocking of blacklisted encrypted domains, in accordance with an embodiment.

FIG. 6 further illustrates a system and method for use of a suffix tree to control blocking of blacklisted encrypted domains, in accordance with an embodiment.

As illustrated in FIG. 6, in accordance with an embodiment, upon receiving the crypto response 150 from the crypto engine, including encrypted hash keys for each of the domain name sub-labels associated with the DNS or other domain-related request packet, the system, using the hash key pair, inserts 152 an encrypted hash key, for each domain node, into the hash table.

Figure 7:
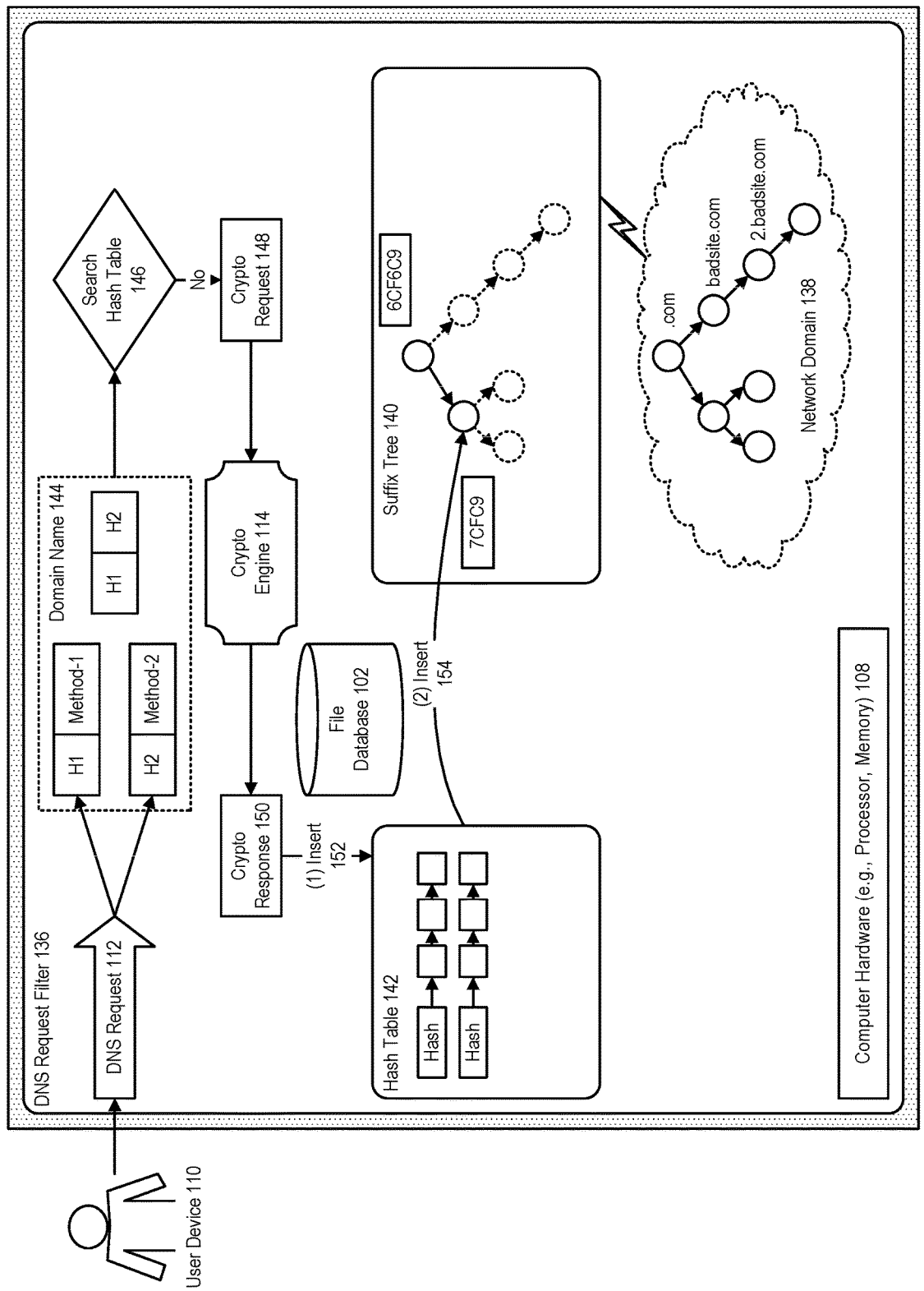
FIG. 7 further illustrates a system and method for use of a suffix tree to control blocking of blacklisted encrypted domains, in accordance with an embodiment.

FIG. 7 further illustrates a system and method for use of a suffix tree to control blocking of blacklisted encrypted domains, in accordance with an embodiment.

As illustrated in FIG. 7, in accordance with an embodiment, since in this instance the encrypted hash key for each domain node is being created for the first time, the system also creates 154 a corresponding entry in the suffix tree.

Figure 8:
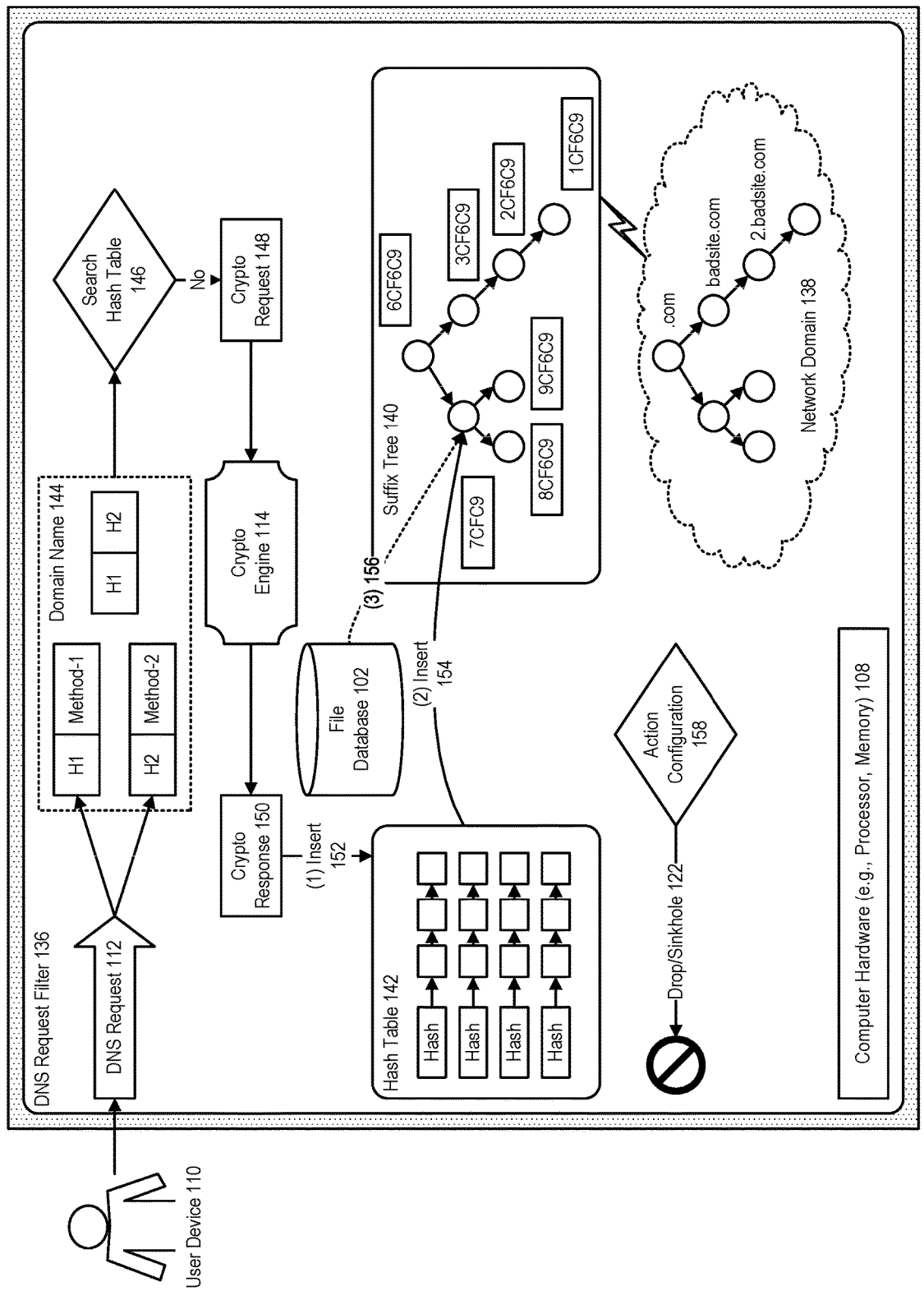
FIG. 8 further illustrates a system and method for use of a suffix tree to control blocking of blacklisted encrypted domains, in accordance with an embodiment.

FIG. 8 further illustrates a system and method for use of a suffix tree to control blocking of blacklisted encrypted domains, in accordance with an embodiment.

As illustrated in FIG. 8, in accordance with an embodiment, a call or lookup is made to the file database, with the encrypted hash key, to determine if any particular node(s) in the suffix tree should be identified 156 or updated as a blacklisted node. If, based on the information stored in the file database, the node associated with the DNS or other domain-related request packet and domain name is indeed determined to be a blacklisted node, then the system can perform any specified action 158 (e.g., drop/sinkhole, replace, report) associated with that node.

Figure 9:
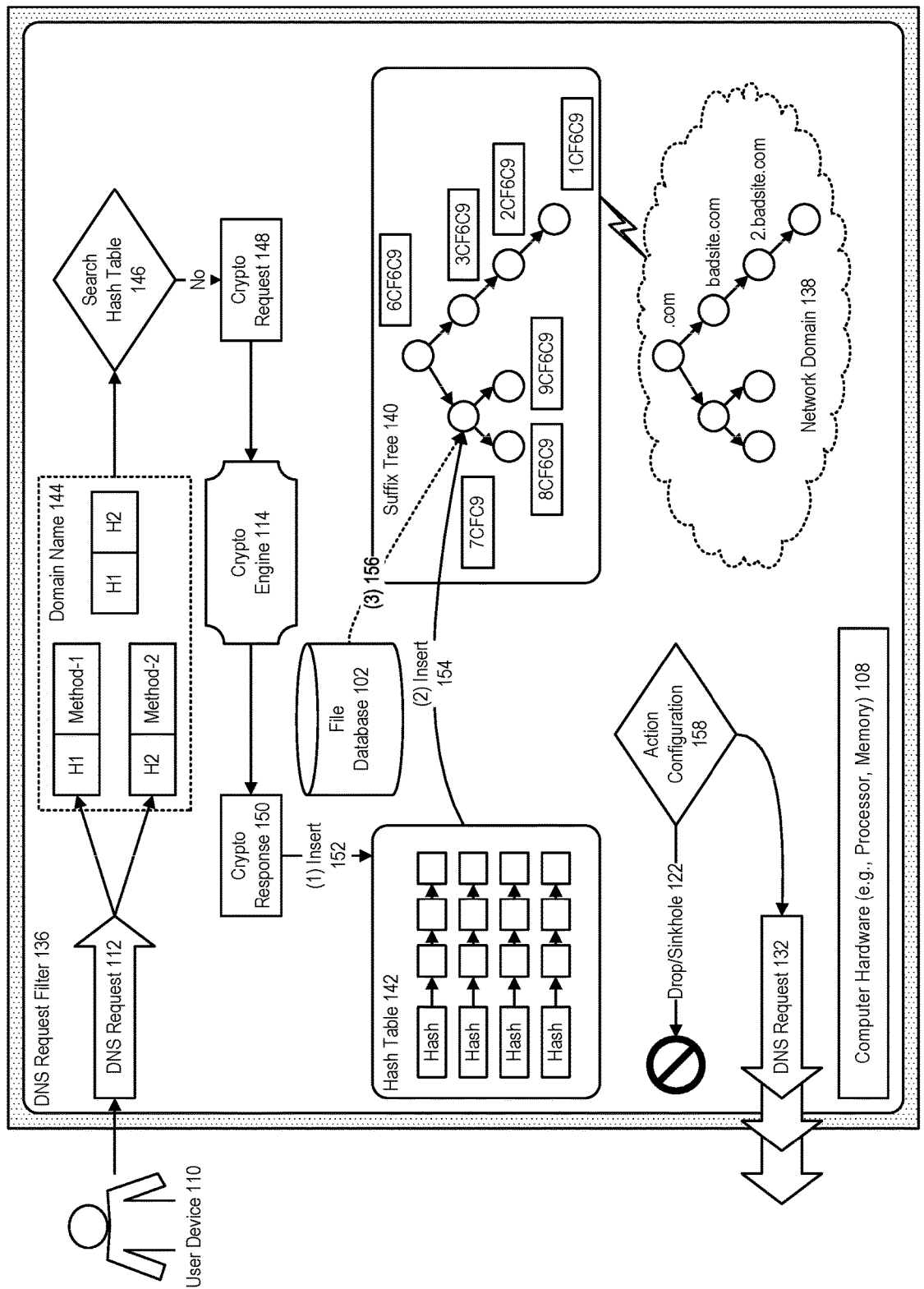
FIG. 9 further illustrates a system and method for use of a suffix tree to control blocking of blacklisted encrypted domains, in accordance with an embodiment.

FIG. 9 further illustrates a system and method for use of a suffix tree to control blocking of blacklisted encrypted domains, in accordance with an embodiment.

As illustrated in FIG. 9, in accordance with an embodiment, depending on the receipt of a crypto response from the crypto engine, for each of the domain name sub-label, the DNS or other domain-related request packet can be forwarded; or otherwise processed as appropriate.

The above paragraphs describe an embodiment of the process used when the hash table is searched with the generated hash key pair (H1, H2), and a corresponding entry is not found in the hash table (FIG. 5), as may be the case with a DNS or other domain-related request for a query. In accordance with an embodiment, if instead the hash table is searched with the generated hash key pair (H1, H2), and a corresponding entry is found in the hash table, for example, as may be the case with a DNS or other domain-related request for a repeated DNS query, then the system operates a different process, as described below.

Figure 10:
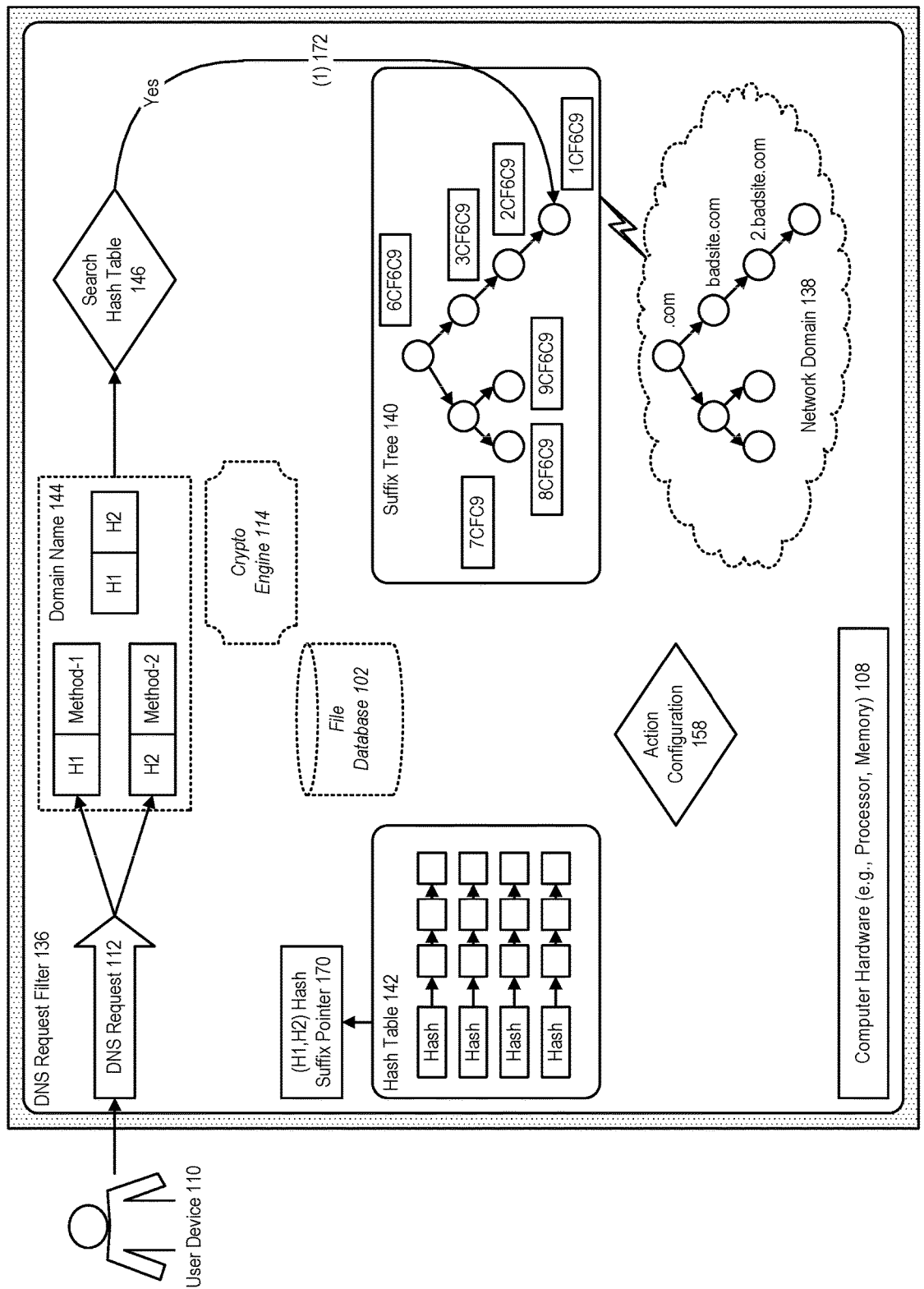
FIG. 10 further illustrates a system and method for use of a suffix tree to control blocking of blacklisted encrypted domains, in accordance with an embodiment.

FIG. 10 further illustrates a system and method for use of a suffix tree to control blocking of blacklisted encrypted domains, in accordance with an embodiment.

As illustrated in FIG. 10, in accordance with an embodiment, when a corresponding entry is found in the hash table, then a corresponding hash suffix pointer 170 is determined for the DNS or other domain-related request packet, and the suffix tree node is examined 172 to determine whether the node identified by the repeated query is part of a blacklisted node.

Figure 11:
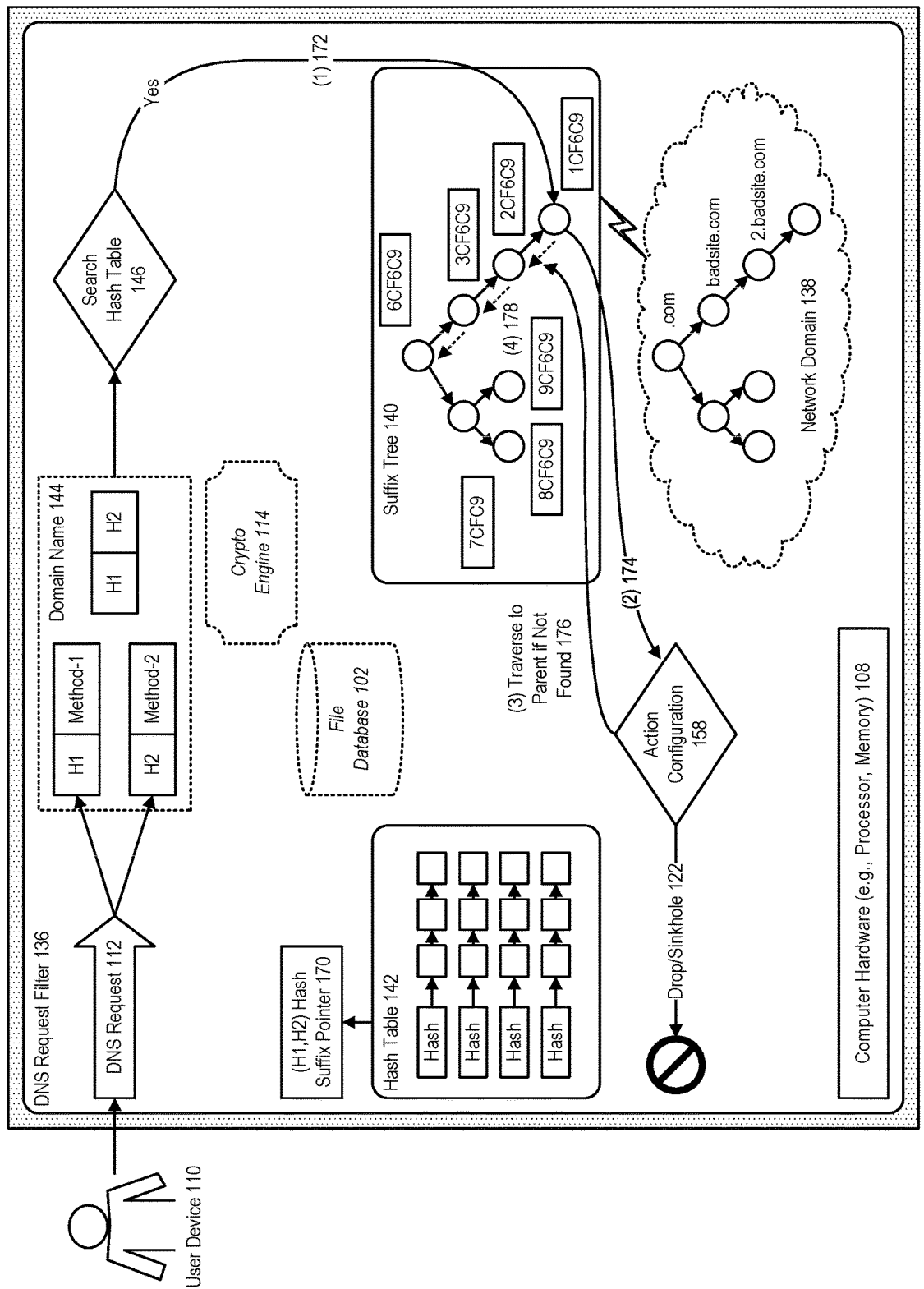
FIG. 11 further illustrates a system and method for use of a suffix tree to control blocking of blacklisted encrypted domains, in accordance with an embodiment.

FIG. 11 further illustrates a system and method for use of a suffix tree to control blocking of blacklisted encrypted domains, in accordance with an embodiment.

As illustrated in FIG. 11, in accordance with an embodiment, if the suffix tree indicates the node to be part of a blacklisted node, then the system can perform any specified action 174 (e.g., drop/sinkhole, replace, report) associated with that node. Otherwise, processing traverses or continues 176 to the immediate parent node, and repeats 178 until the root parent node is reached.

Figure 12:
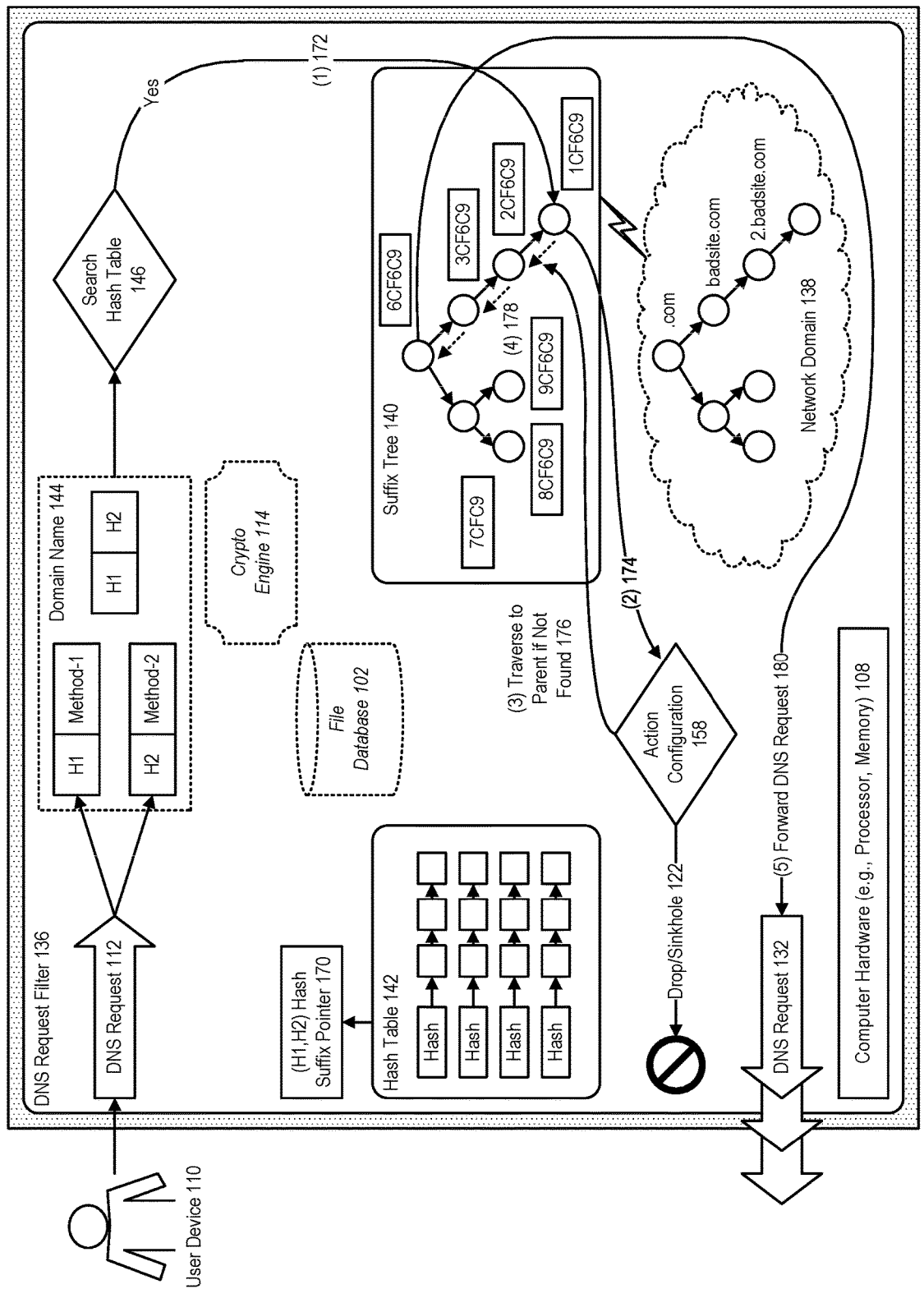
FIG. 12 further illustrates a system and method for use of a suffix tree to control blocking of blacklisted encrypted domains, in accordance with an embodiment.

FIG. 12 further illustrates a system and method for use of a suffix tree to control blocking of blacklisted encrypted domains, in accordance with an embodiment.

As illustrated in FIG. 12, in accordance with an embodiment, if the above process does not result in a blacklisted node being found, then the DNS or other domain-related request packet can be forwarded 180 or otherwise processed as appropriate.

In accordance with an embodiment, the various component or features of the system and method described above can be provided as software or program code executable by a computer system or other processing device, prepared in accordance with the teachings herein.

Handling of DNS Request for a New Query

In accordance with an embodiment, the process or algorithm for handling a DNS request for a new query from a user device generally includes:

(1) Upon receipt at a DNS request filter, of a DNS request packet, a target domain name is extracted from the packet.

(2) A pair of hash keys (H1, H2) are generated for the request packet and target domain, using a hash key generation method. For example, in accordance with an embodiment, a pair of 32-bit hash keys can be generated using a conventional MD5 (Message Digest 5) method or algorithm, or other type of cryptographic hash algorithm.

(3) With the generated hash key pair (H1, H2), a hash table is searched. If an entry corresponding to the generated hash key pair is not found in the hash table, then the system bulk posts or otherwise communicates crypto requests, for each of the domain name sub-labels associated with the domain name (as identified by the DNS request), to at least one of a hardware or software crypto engine.

For example, as described above, if the DNS request packet is directed to resolving the domain name "4.3.2.1.badsite.com", then crypto requests can be posted or otherwise communicated to the crypto engine for each of the "4.3.2.1.badsite.com", "3.2.1.badsite.com", "2.1.badsite.com", "1.badsite.com", and "badsite.com" domain name sub-labels.

(4) Upon receiving the crypto response from the crypto engine, including encrypted hash keys for each of the domain name sub-labels associated with the DNS request packet, the system, using the hash key pair (H1, H2), inserts an encrypted hash key, for each domain node, into the hash table.

(5) Since in this instance the encrypted hash key for each domain node is being created for the first time, the system also creates a corresponding entry in the suffix tree. For example, in accordance with an embodiment, the system can insert a corresponding node/entry into the suffix tree, using a suffix tree insertion process. This results in a parent node within the suffix tree being associated with each of its domain name sub-labels. A call or lookup is made to the file database, with the encrypted hash key, to determine if any particular node(s) in the suffix tree should be identified or updated as a blacklisted node.

(6) If, based on the information stored in the file database, the node associated with the DNS request packet and domain name is indeed determined to be a blacklisted node, then the system can perform any specified action (e.g., drop/sinkhole, replace, report) associated with that node. Otherwise, the DNS request packet can be forwarded or otherwise processed as appropriate.

(7) The process of receiving crypto response from the crypto engine, for each of the domain name sub-labels, and inserting encrypted hash keys for each domain node into the hash table (4), is repeated for each of the remaining crypto response(s) received from the crypto engine for those sub-labels.

Figure 13:
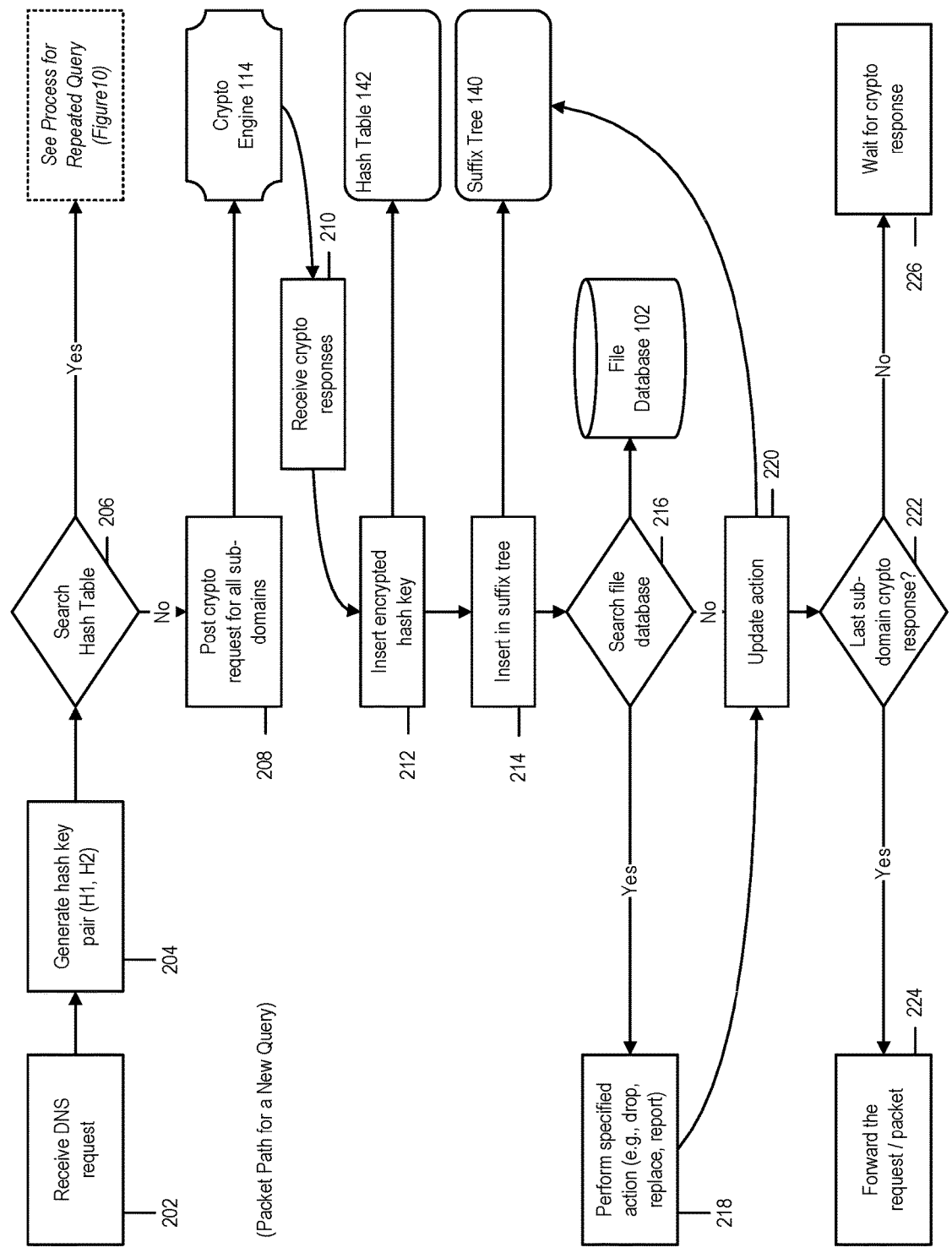
FIG. 13 illustrates the use of a suffix tree to process a DNS or other domain-related request packet path for a new query, in accordance with an embodiment.

FIG. 13 illustrates a process used by a system in accordance with an embodiment, including processing of a DNS request packet path for a new query.

As illustrated in FIG. 13, in accordance with an embodiment, the process can include, at step 202, wherein a DNS request packet is received, and a target domain name is extracted from the packet.

At step 204, a pair of hash keys (H1, H2) are generated for the request packet and target domain, using a hash key generation method.

At step 206, a hash table is searched with the generated hash key pair. If an entry corresponding to the generated hash key pair is not found in the hash table, then, at step 208, the system bulk posts or otherwise communicates crypto requests, for each of the domain name sub-labels associated with the domain name (as identified by the DNS request), to at least one of a hardware or software crypto engine.

At step 210, upon receiving the crypto response from the crypto engine, including encrypted hash keys for each of the domain name sub-labels associated with the DNS request packet, the system, at step 212, using the hash key pair, inserts an encrypted hash key, for each domain node, into the hash table.

At step 214, since in this instance the encrypted hash key for each domain node is being created for the first time, the system also creates a corresponding entry in the suffix tree.

At step 216, a call or lookup is made to the file database, with the encrypted hash key, to determine if any particular node(s) in the suffix tree should be identified or updated as a blacklisted node. If, based on the information stored in the file database, the node associated with the DNS request packet and domain name is indeed determined to be a blacklisted node, then the system can, at steps 218, 220 perform any specified action (e.g., drop/sinkhole, replace, report) associated with that node.

At step 222, depending on the receipt of a crypto response from the crypto engine, for each of the domain name sub-label, the DNS request packet can, at step 224, be forwarded; or otherwise, at step 226, processed as appropriate.

Handling of DNS Request for a Repeated Query

In accordance with an embodiment, the process or algorithm for handling a DNS request for a repeated query from a user device generally includes:

(1) Upon receipt at a DNS request filter, of a DNS request packet, a target domain name is extracted from the packet.

(2) A pair of hash keys (H1, H2) are generated for the request packet and target domain, using a hash key generation method. For example, in accordance with an embodiment, a pair of 32-bit hash keys can be generated using a conventional MD5 (Message Digest 5) method or algorithm, or other type of cryptographic hash algorithm.

In accordance with an embodiment, the above two steps are the same as those described above with regard to the processing of a DNS request packet for a new query.

(3) With the generated hash key pair (H1, H2), a hash table is again searched. If a corresponding entry is found in the hash table, then a corresponding hash suffix pointer is determined for the DNS request packet.

(4) Upon determination of the hash suffix pointer, the suffix tree node is examined to determine whether the node identified by the repeated query is part of a blacklisted node (as determined by the above-described entry in the file database). If the suffix tree indicates the node to be part of a blacklisted node, then the system can perform any specified action (e.g., drop/sinkhole, replace, report) associated with that node. Otherwise, processing traverses or continues to the immediate parent node.

(5) The immediate parent node represents the next sub-level. If continued examination of the suffix tree indicates the node to be part of a blacklisted node, then the system can similarly perform any specified action (e.g., drop/sinkhole, replace, report) associated with that node. Otherwise, processing traverses or continues to the immediate parent node, and repeats until the root parent node is reached.

(6) If the above process does not result in a blacklisted node being found, then the DNS request packet can be forwarded or otherwise processed as appropriate.

Figure 14:
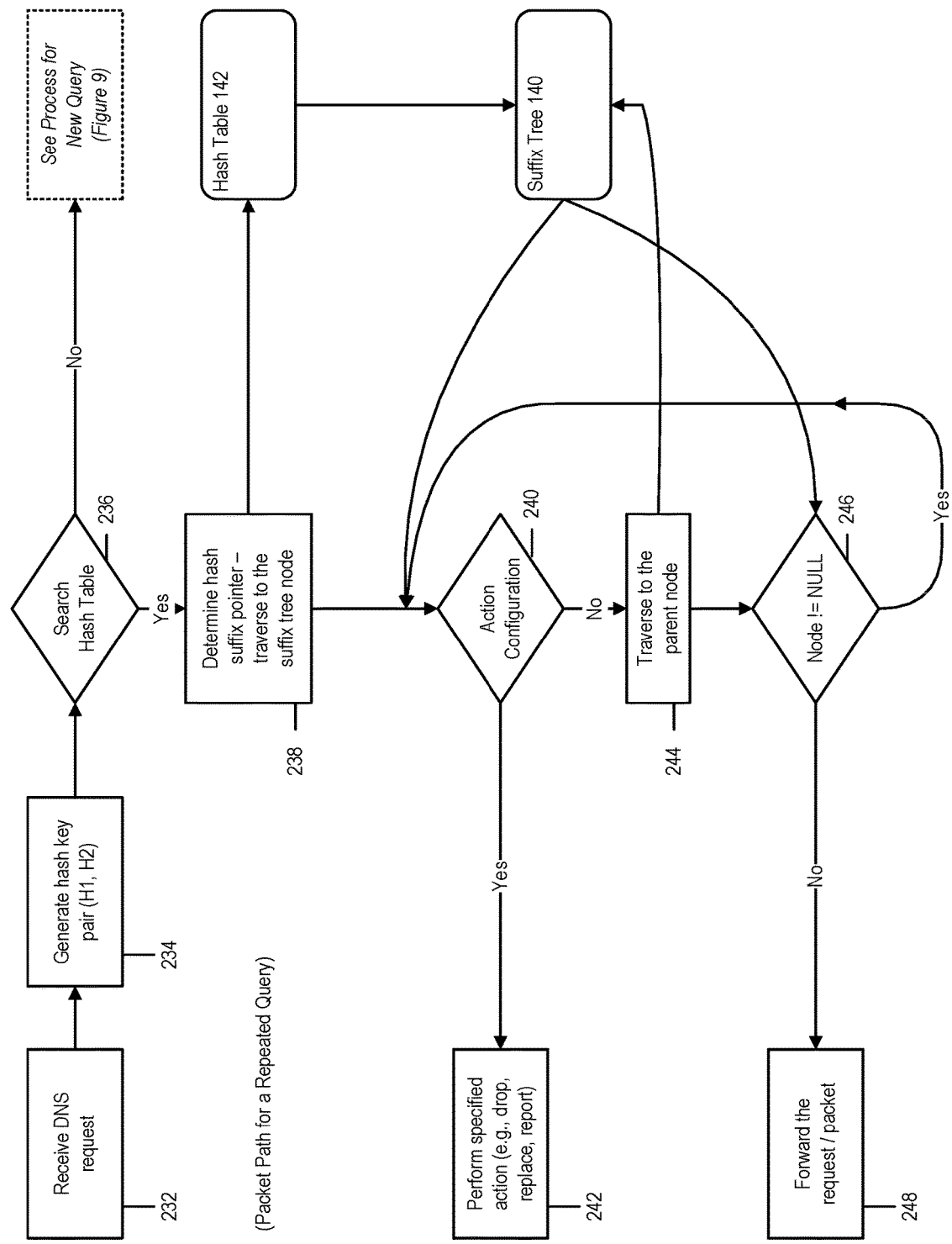
FIG. 14 illustrates the use of a suffix tree to process a DNS or other domain-related request packet path for a repeated query, in accordance with an embodiment.

FIG. 14 illustrates a process used by a system in accordance with an embodiment, including processing of a DNS request packet path for a repeated query.

As illustrated in FIG. 14, in accordance with an embodiment, the process can include, at step 232, wherein a DNS request packet is received, and a target domain name is extracted from the packet.

At step 234, a pair of hash keys (H1, H2) are generated for the request packet and target domain, using a hash key generation method.

At step 236, a hash table is searched with the generated hash key pair. If an entry corresponding to the generated hash key pair is found in the hash table, then, at step 238, a corresponding hash suffix pointer is determined for the DNS request packet, and the suffix tree node is examined to determine whether the node identified by the repeated query is part of a blacklisted node.

At step 240, if the suffix tree indicates the node to be part of a blacklisted node, then the system can, at step 242, perform any specified action (e.g., drop/sinkhole, replace, report) associated with that node. Otherwise, at step 244, processing traverses or continues to the immediate parent node.

At step 246, processing traverses or continues to the immediate parent node, and repeats until the root parent node is reached (Node !=NULL).

At step 248, if the above process does not result in a blacklisted node being found, then the DNS request packet can be forwarded or otherwise processed as appropriate.

Example Technical Advantages

In accordance with various embodiments, technical advantages of the described approach include, for example, that it can leverage much of the encrypted crypto hash conversions; provides a method through which network security devices can optimize multiple lookups on the domain-names up to n labels (each label is sub domain); and enables a cloud provider or security software vendor to block blacklisted domain DNS queries or direct them to a sinkhole in a cloud environment with high performance and scale.

In some environments, crypto operations using hardware engine generally require a lot of state keeping. Bulk crypto requests are posted to a hardware engine and, until the responses are received, the original DNS or other domain-related request packet has to be held in the plugin. When the response is received, the original DNS request packet context has to be derived and lookup has to be performed.

With conventional approaches, when the new DNS or other domain-related request packet is received with the same domain name again, the whole procedure is repeated. This results in latency inability to scale. In accordance with various embodiments, with the described approach, multiple crypto operations for the same query are avoided by re-using the processing time/state of the previously received request.

In accordance with various embodiments, the described approach improves the processing time for most commonly seen domain names. It provides better performance and can scale linearly with historically processed DNS requests so that same DNS requests would not encounter any further latency.

In accordance with various embodiments, the described approach provides a combined crypto plus software algorithmic approach by maintaining some indirect mapping between the asymmetric hash key and domain-name in a secured mode and thereby saving performance cycles and improving the latencies.

In some environments, FedRAMP compliancy generally mandates that plain text to encrypted crypto hash mapping cannot be stored directly in the software. A user should never be able to derive the blacklisted domain names from the core-dump or examining the memory. In accordance with various embodiments, the described approach achieves this by using hash key pair as key and tag that hash-pair to an encrypted value.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein generally describe the use of network security devices, and cloud computing environments, to process DNS requests; other embodiments can be used with other types of computing environments, and other types of domain-related requests.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use of a suffix tree to control blocking of blacklisted encrypted domains, comprising:
    at least one of a network security device or computer having a processor and providing a suffix tree that includes encrypted hash keys corresponding to a plurality of domain nodes,
        wherein the suffix tree is generated by encrypting hash keys corresponding to a plurality of domain nodes, including performing encryption operations on a domain-name having multiple labels, and receiving encrypted hash key values for each of a plurality of sub-labels corresponding to the domain nodes; and
        wherein a hash table maintains a mapping between hash key pairs and generated encrypted hash key values provided within the suffix tree;
    whereupon a domain-related request packet is received:
        a target domain name is extracted from the request packet;
        a pair of hash keys are generated for the request packet and the target domain;
        the hash table is searched with the generated hash key pair; and
    whereupon a corresponding entry is found in the hash table,
        a corresponding hash suffix pointer is determined for the request packet, and
        the suffix tree is examined using the hash suffix pointer, to determine whether a domain node identified by the request packet is part of a blacklisted node; and
    wherein if the suffix tree indicates the domain node to be part of a blacklisted node, then a specified action associated with the request packet and that node is performed.

2. The system of claim 1, whereupon the corresponding entry is not found in the hash table, then the system posts or otherwise communicates crypto requests, for each of the domain name sub-labels associated with the domain name, to at least one of a hardware or software crypto engine.

3. The system of claim 2, whereupon receiving crypto responses from the crypto engine, including encrypted hash keys for each of the domain name sub-labels associated with the DNS or other domain-related request packet, the system, using the hash key pair, inserts an encrypted hash key, for each domain node, into the hash table.

4. The system of claim 3, wherein the system also creates a corresponding entry in the suffix tree; and call or lookup is made to the file database, with the encrypted hash key, to determine if any particular node(s) in the suffix tree should be identified or updated as a blacklisted node.

5. The system of claim 1, wherein each of the hash table and suffix tree are stored in a memory and hash table and suffix tree are used by a DNS request filter to control blocking of blacklisted encrypted domains.

6. A method for use of a suffix tree to control blocking of blacklisted encrypted domains, comprising:
  providing a suffix tree that includes encrypted hash keys corresponding to a plurality of domain nodes,
    wherein the suffix tree is generated by encrypting hash keys corresponding to a plurality of domain nodes, including performing encryption operations on a domain-name having multiple labels, and receiving encrypted hash key values for each of a plurality of sub-labels corresponding to the domain nodes; and
    wherein a hash table maintains a mapping between hash key pairs and generated encrypted hash key values provided within the suffix tree;
  whereupon a domain-related request packet is received:
    a target domain name is extracted from the request packet;
    a pair of hash keys are generated for the request packet and the target domain;
    the hash table is searched with the generated hash key pair; and
  whereupon a corresponding entry is found in the hash table,
    a corresponding hash suffix pointer is determined for the request packet, and
    the suffix tree is examined using the hash suffix pointer, to determine whether a domain node identified by the request packet is part of a blacklisted node; and
  wherein if the suffix tree indicates the domain node to be part of a blacklisted node, then a specified action associated with the request packet and that node is performed.

7. The method of claim 6, whereupon the corresponding entry is not found in the hash table, then the system posts or otherwise communicates crypto requests, for each of the domain name sub-labels associated with the domain name, to at least one of a hardware or software crypto engine.

8. The method of claim 7, whereupon receiving crypto responses from the crypto engine, including encrypted hash keys for each of the domain name sub-labels associated with the DNS or other domain-related request packet, the system, using the hash key pair, inserts an encrypted hash key, for each domain node, into the hash table.

9. The method of claim 8, wherein the system also creates a corresponding entry in the suffix tree; and call or lookup is made to the file database, with the encrypted hash key, to determine if any particular node(s) in the suffix tree should be identified or updated as a blacklisted node.

10. The method of claim 6, wherein each of the hash table and suffix tree are stored in a memory and hash table and suffix tree are used by a DNS request filter to control blocking of blacklisted encrypted domains.

11. A non-transitory computer readable storage medium, including instructions stored thereon which when read and executed by at least one of a computer or other electronic device causes the at least one of a computer or other electronic device to perform a method comprising:
  providing a suffix tree that includes encrypted hash keys corresponding to a plurality of domain nodes,
    wherein the suffix tree is generated by encrypting hash keys corresponding to a plurality of domain nodes, including performing encryption operations on a domain-name having multiple labels, and receiving encrypted hash key values for each of a plurality of sub-labels corresponding to the domain nodes; and
    wherein a hash table maintains a mapping between hash key pairs and generated encrypted hash key values provided within the suffix tree;
  whereupon a domain-related request packet is received:
    a target domain name is extracted from the request packet;
    a pair of hash keys are generated for the request packet and the target domain;
    the hash table is searched with the generated hash key pair; and
  whereupon a corresponding entry is found in the hash table,
    a corresponding hash suffix pointer is determined for the request packet, and
    the suffix tree is examined using the hash suffix pointer, to determine whether a domain node identified by the request packet is part of a blacklisted node; and
  wherein if the suffix tree indicates the domain node to be part of a blacklisted node, then a specified action associated with the request packet and that node is performed.

12. The non-transitory computer readable storage medium of claim 11, whereupon the corresponding entry is not found in the hash table, then the system posts or otherwise communicates crypto requests, for each of the domain name sub-labels associated with the domain name, to at least one of a hardware or software crypto engine.

13. The non-transitory computer readable storage medium of claim 12, whereupon receiving crypto responses from the crypto engine, including encrypted hash keys for each of the domain name sub-labels associated with the DNS or other domain-related request packet, the system, using the hash key pair, inserts an encrypted hash key, for each domain node, into the hash table.

14. The non-transitory computer readable storage medium of claim 13, wherein the system also creates a corresponding entry in the suffix tree; and call or lookup is made to the file database, with the encrypted hash key, to determine if any particular node(s) in the suffix tree should be identified or updated as a blacklisted node.

15. The non-transitory computer readable storage medium of claim 11, wherein each of the hash table and suffix tree are stored in a memory and hash table and suffix tree are used by a DNS request filter to control blocking of blacklisted encrypted domains.

* * * * *